(12) United States Patent
Rittenhouse et al.

(10) Patent No.: US 9,838,910 B2
(45) Date of Patent: Dec. 5, 2017

(54) CHANNEL MANAGEMENT IN WIRELESS NETWORKS

(71) Applicant: Simmonds Precision Products, Inc., Vergennes, VT (US)

(72) Inventors: Garret E. Rittenhouse, Burlington, VT (US); Jonathan Wieman, Ferrisburg, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 144 days.

(21) Appl. No.: 14/987,536

(22) Filed: Jan. 4, 2016

(65) Prior Publication Data

US 2017/0195919 A1    Jul. 6, 2017

(51) Int. Cl.
*H04L 12/26* (2006.01)
*H04L 29/08* (2006.01)
*H04W 28/08* (2009.01)

(52) U.S. Cl.
CPC ....... *H04W 28/085* (2013.01); *H04L 43/0882* (2013.01); *H04L 67/12* (2013.01)

(58) Field of Classification Search
None
See application file for complete search history.

(56) References Cited

U.S. PATENT DOCUMENTS

| | | |
|---|---|---|
| 5,530,917 A | 6/1996 | Andersson et al. |
| 8,982,784 B2 | 3/2015 | Muller et al. |
| 2004/0203820 A1 | 10/2004 | Billhartz |
| 2004/0264394 A1 | 12/2004 | Ginzburg et al. |
| 2008/0253308 A1* | 10/2008 | Ward ............ H04W 40/02 370/310 |
| 2009/0268669 A1* | 10/2009 | Ko ............ H04J 11/0069 370/328 |
| 2013/0107829 A1* | 5/2013 | Shao ............ H04W 72/02 370/329 |
| 2013/0107830 A1* | 5/2013 | Jones, IV ............ H04W 16/14 370/329 |
| 2015/0085841 A1* | 3/2015 | Sadek ............ H04W 72/1215 370/336 |
| 2015/0103680 A1 | 4/2015 | Anand et al. |
| 2015/0296516 A1* | 10/2015 | Jung ............ H04W 72/02 370/312 |
| 2016/0007362 A1* | 1/2016 | Ayadurai ............ H04W 72/085 370/329 |

OTHER PUBLICATIONS

European Search Report received from European Patent Office dated Jun. 8, 2017 for Application No. 16206215.2.

* cited by examiner

*Primary Examiner* — Chi H Pham
*Assistant Examiner* — Soon-Dong D Hyun
(74) *Attorney, Agent, or Firm* — Locke Lord LLP; Scott D. Wofsy; Christopher J. Cillié

(57) ABSTRACT

A channel management method includes determining utilization of a primary wireless channel, determining utilization of one or more secondary wireless channels, and comparing utilization of the primary wireless channel with utilization of the each of the one or more secondary wireless channels. If utilization of a secondary wireless channel of the one or more secondary wireless channels is lower than the utilization of the primary channel, data communication between a data concentrator and a remote wireless node is routed from the primary channel to the secondary channel.

22 Claims, 4 Drawing Sheets

CHANNEL MANAGEMENT IN WIRELESS NETWORKS

BACKGROUND OF THE INVENTION

1. Field of the Invention

The present disclosure relates to wireless communication, and more particularly to channel management in wireless communication networks.

2. Description of Related Art

Aircraft commonly include devices that communicate with one another wirelessly, typically over one or more wireless networks established within the aircraft environs. Since the electromagnetic spectrum is finite, the frequency range allocated to such wireless networks is typically divided into one or more group of wireless channels for purposes of managing usage. Each wireless channel generally occupies a frequency band within the frequency range, and wireless devices pass wireless traffic over a set of wireless channels. In some wireless networks, the volume of wireless traffic passing between various wireless devices connected to the network can exceed the capability of an assigned wireless channel or set of channels, potentially degrading the ability of the network to pass traffic among the wireless devices connected to the wireless network. Furthermore, the radio frequency environment on aircraft itself may change over time according to the aircraft flight regime and aircraft configuration, some regimes and/or aircraft configurations tending to make wireless communication more difficult on one channel and/or facilitating wireless communication on another channel.

Such conventional methods and systems have generally been considered satisfactory for their intended purpose. However, there is still a need in the art for improved systems and methods of wireless channel management in wireless data networks. The present disclosure provides a solution for this need.

SUMMARY OF THE INVENTION

A channel management method includes determining utilization of a primary wireless channel, determining utilization of one or more secondary wireless channels, and comparing utilization of the primary wireless channel with utilization of the each of the one or more secondary wireless channels. If utilization of a secondary wireless channel of the one or more secondary wireless channels is lower than the utilization of the primary channel, data communication between a data concentrator and a remote wireless node is routed from the primary channel to the secondary channel.

In certain embodiments, the method can include transmitting and receiving data communication between the remote data concentrator and the wireless node over the primary wireless channel. Determining utilization of the primary wireless channel can include determining the volume of data communication over the primary wireless channel, such as by using a transceiver transmitting and receiving data communication over the primary wireless channel. Determining utilization of the secondary wireless can include determining the volume of data communication over the secondary wireless channel using a transceiver only receiving, and not transmitting, data communication between remote wireless nodes over the secondary wireless channel.

In accordance with certain embodiments, the method can include designating the secondary wireless channel a new primary wireless channel, the old secondary wireless channel thereby becoming the new wireless channel for data communication between the wireless node and the remote data concentrator. Designating the secondary wireless channel a new primary wireless channel can include switching a transceiver only receiving data communication in over the secondary wireless channel into an active mode, the transceiver thereafter both transmitting and receiving data communication over the secondary wireless channel designated as the new primary wireless channel. The method can include designating the primary wireless channel a new secondary wireless channel, the primary wireless channel thereby becoming a new secondary wireless channel. Designating the primary wireless channel a new secondary wireless channel can include switching a transceiver transmitting and receiving data communication over the primary wireless channel in an active mode to a passive mode, the transceiver thereafter receiving data communication over the primary wireless channel designated as a new secondary wireless channels. It is also contemplated that transceivers communicating over the primary and second wireless channels can operate independent of one another.

It is also contemplated that, in accordance with certain embodiments, the method can including switching a first transceiver into the passive mode to monitor the new secondary wireless channel, and switching a second transceiver into the active mode to both transmit and receive data communication over the new primary wireless channel. Switching can be asynchronous, the first transceiver switching into the passive mode at a different time than the time at which the second transceiver switches into the active mode. Switching of the first transceiver switching into the passive mode can occur after a predetermined delay interval. Prior to the toll of the delay interval, and subsequent to the second transceiver switching into the active mode, the first transceiver can monitor the old primary wireless channel for wireless nodes attempting to communicate with the remote data concentrator. In the event that a wireless nodes attempts to communicate with the remote data concentrator over the old primary wireless channel, the first transceiver can instructions to the wireless node to communicate with the remote data concentrator through the second transceiver over the new primary wireless channel.

A data concentrator for a wireless network includes a first transceiver, a second transceiver, and a control module. The second transceiver is configured for operation independent of the first transceiver. The control module is operatively connected to the first transceiver and the second transceiver and is responsive to machine readable instructions received from the control module to implement the method as described above. In certain embodiments, both the first and second transceivers can have active and passive modes as described above. The first transceiver can be identical to the second transceiver. The first and second transceivers can be housing together in a common remote data concentrator housing, such as components of an integral assembly. In accordance with certain embodiments, the data concentrator may be a remote data concentrator for an aircraft wireless data network.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
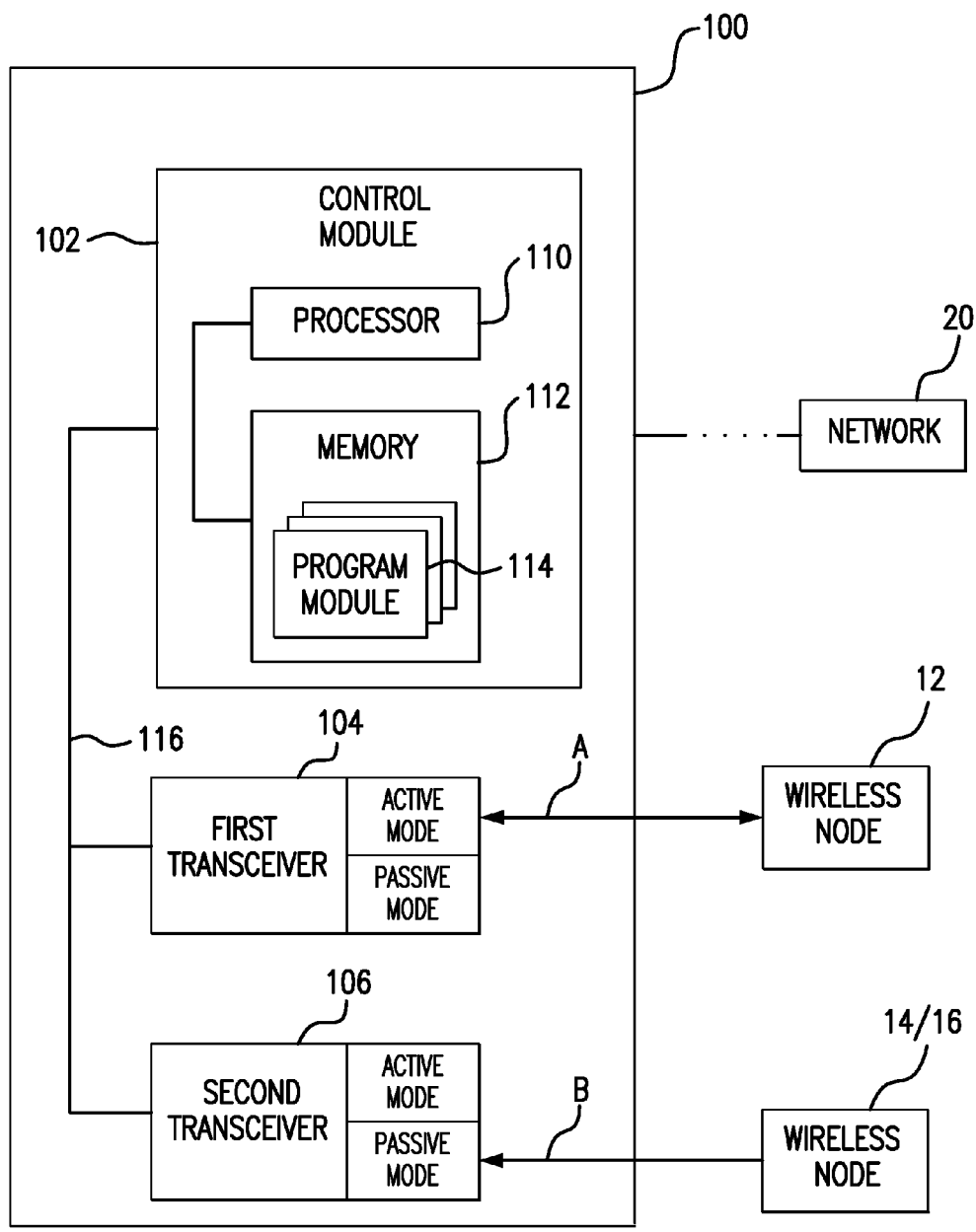
FIG. 1 is a schematic diagram of an exemplary embodiment of a data concentrator constructed in accordance with the present disclosure, showing a control module operatively connected to first and second transceivers.

Reference will now be made to the drawings wherein like reference numerals identify similar structural features or aspects of the subject disclosure. For purposes of explanation and illustration, and not limitation, a partial view of an exemplary embodiment of a data concentrator in accordance with the disclosure is shown in FIG. 1 and is designated generally by reference character 100. Other embodiments of data concentrators and methods of managing wireless channels in wireless data networks in accordance with the disclosure, or aspects thereof, are provided in FIGS. 2-4, as will be described. The systems and methods described herein can be used for aircraft wireless data networks, however, the invention is not limited to aircraft wireless data networks nor to data communication networks in general.

Referring to FIG. 1, an aircraft wireless data network 10 is shown. Aircraft wireless data network 10 includes one or more wireless nodes, e.g., wireless nodes 12-16, a data concentrator 100 communicative with the one or more wireless nodes 12-16, and a backbone or network 20. Data concentrator 100 interconnects the one or more remote wireless nodes 12 with backbone or network 20, and is configured and adapted to route data to and from the one or more wireless nodes 12 and other nodes (not shown for purposes of clarity) through backbone or network 20. It is contemplated that data concentrator 100 can be a remote data concentrator arranged within a dynamic radio-frequency environment occupied by wireless nodes, some of which are connected to a backbone or network 14 through data concentrator 100.

Data concentrator 100 includes a control module 102 that is operatively connected to a first transceiver 104 and a second transceiver 106 through a link 116. Control module 102 includes a processor 110 communicative with a non-transitory memory 112 having a plurality of program modules 114 recorded thereon with instructions recorded thereon that, where read by processor 110, causes control module 102 to execute certain operations, as detailed the methods described below. Although illustrated as having both circuitry and software in the illustrated exemplary embodiment, it is to be appreciated and understood control module 102 can be implemented in either circuitry, software, or as both circuitry and software.

First transceiver 104 has an active mode and a passive mode and is configured and adapted to be switched from the active mode to the passive mode, and from the passive mode to the active mode, upon receipt of instructions from control module 102. When in the active mode first transceiver 104 both transmits and receives data communication over a primary wireless channel designated by control module 102. When in the passive mode, first transceiver 104 receives data communication wirelessly over a secondary wireless channel designated by control module 102.

In embodiments, first transceiver 104 only receives wireless data communication over the designated secondary wireless channel. In certain embodiments, subsequent to switching from the active mode into the passive mode, first transceiver 104 (a) identifies wireless nodes associated with remote data concentrator 100 communicating over a designated secondary wireless node, and (b) instructs the identified wireless nodes to communicate with data concentrator 100 over a designated primary wireless channel. The identification and instruction can take place over a predetermined interval, after which first transceiver 104 only receives data communication over the second wireless channel. Second transceiver 106 is substantially identical to first transceiver 104, and is independently operable of first transceiver 104.

Figure 2:
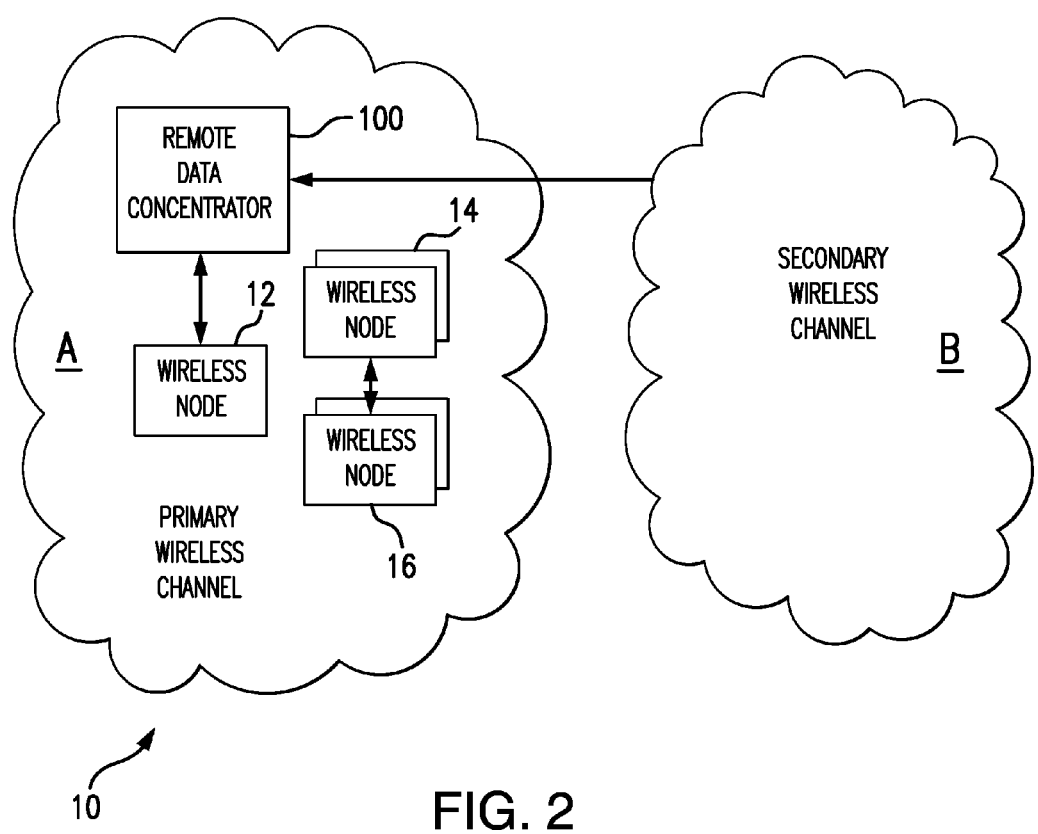
FIG. 2 is a diagram of a wireless data communication network for an aircraft including the remote data concentrator of FIG. 1, showing data communication between the data concentrator and a wireless node over a primary wireless channel the data concentrator receiving data communication over a secondary wireless channel.

With reference to FIG. 2, a primary wireless channel A and a secondary wireless channel B are shown. A plurality of wireless data communication exchanges occur over primary wireless channel A. In the exemplary illustrated primary wireless channel A, data concentrator 100 and wireless node 12 transmit and receive data communication between one another, as indicated by the double-headed arrow extending between data concentrator 100 and wireless node 12. Wireless node 16 and wireless node 18 also transmit and receive data communication between one another using primary channel A, as indicated by the double-headed arrow extending between wireless node 16 and wireless node 18. In contrast, no two-way wireless data communication is occurring between data concentrator 100 and wireless node 14 and/or data concentrator 100 and wireless node 16. As will be appreciated by those of skill in the art in view of the present disclosure, because there are fewer, e.g., none shown in FIG. 2, utilization of secondary wireless channel B is lower than utilization of primary wireless channel A. Accordingly, routing data communication between data concentrator 100 and wireless node 12 from primary channel A to secondary channel B allows for improving the quality of data communication between data concentrator 100 and wireless node 12.

Data concentrator 100 manages channel utilization within network 10 to take advantages of radio frequency environments such as that shown in FIG. 2. In particular, data concentrator 100 determines utilization of primary wireless channel A and secondary wireless channel B.

Data concentrator 100 compares the utilization of primary wireless channel A with utilization of secondary wireless channel B. Based on the comparison of utilization of primary wireless channel A with secondary wireless channel B, data concentrator routes data communication between wireless node 12 and data concentrator 100 to secondary wireless channel B to primary wireless channel A if utilization of secondary wireless channel B is less than utilization of primary wireless channel A.

With respect to primary wireless channel A, data concentrator 100 transmits and receives data communication from wireless node 12 over primary wireless channel A using a transceiver switched into the active mode, e.g., first transceiver 104 (FIG. 1) or second transceiver 106 (shown in FIG. 1), as indicated by the double-headed arrow between data concentrator 100 and wireless node 12. Based on the data communication occurring through the transceiver switched into the active mode, which is both transmitting and receiving data communication over primary wireless channel A, data concentrator determines the volume of data communication passing over primary wireless channel A. With respect to secondary wireless channel B, data concentrator 100 receives data communication over secondary wireless channel B using a transceiver switched to into the passive mode, e.g., the other of first transceiver 104 and second transceiver 106, as indicated by the single-headed arrow between data concentrator 100 and secondary wireless channel B. Based on the data communication occurring through the transceiver switched into the passive mode, which is receiving data communication over secondary wireless channel B, data concentrator 100 determines the volume of data communication passing over secondary wireless channel B.

Figure 3:
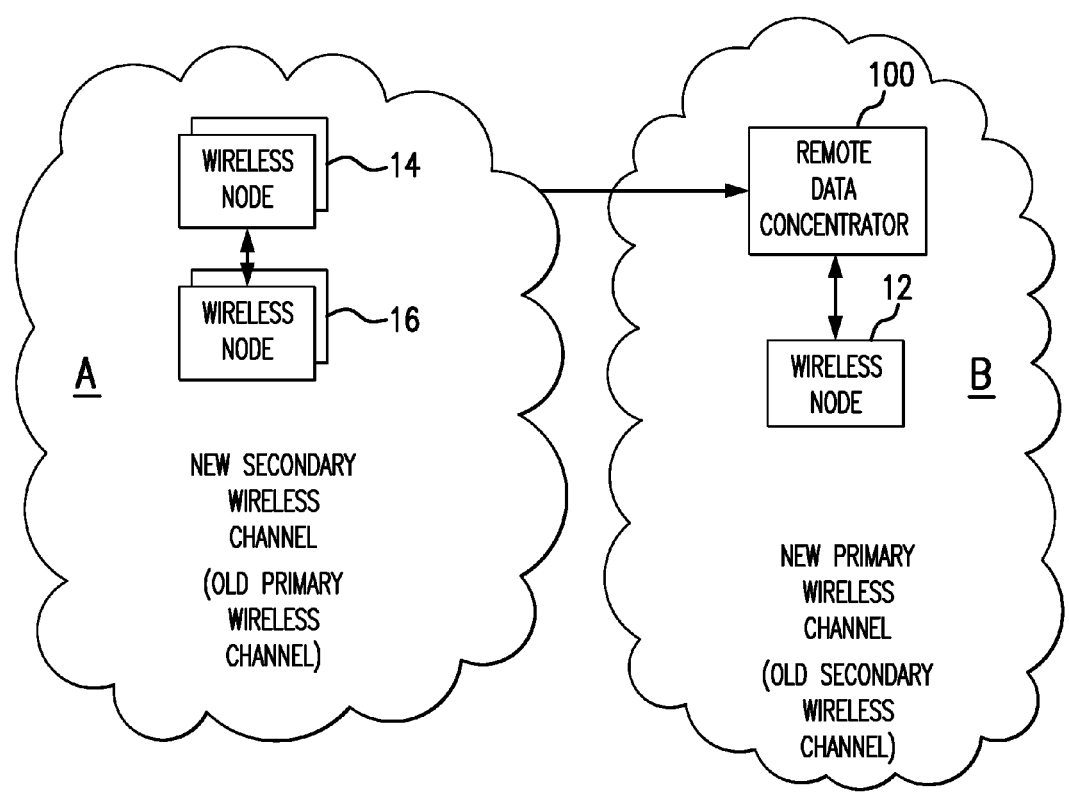
FIG. 3 is a diagram of a wireless data communication network for an aircraft including the remote data concentrator of FIG. 1, showing data communication between the data concentrator and a wireless node over a new primary wireless channel and the remote data concentrator receiving data communication over a new secondary wireless channel.

With reference to FIG. 3, network 10 is shown subsequent to data concentrator 100 identifying a secondary wireless channel with lower utilization than the primary wireless channel. In this regard, if the utilization of secondary wireless channel B is less than the utilization of primary wireless channel A, data concentrator 100 designates secondary wireless channel B as a new primary wireless channel. Responsive to the designation of secondary wireless channel B as a new primary wireless channel, data concentrator 100 switches the mode of the transceiver previously receiving data communication over secondary wireless channel B in the passive mode into the active mode.

Upon designating the secondary wireless channel B a new primary wireless channel, data concentrator 100 also designates the primary wireless channel A as a new secondary wireless channel B. Responsive to the designation of the primary wireless channel a new secondary wireless channel B, data concentrator switches the mode of the transceiver previously transmitting and receiving data communication over the primary into the passive mode, wherein the transceiver only receives data communication passed between wireless nodes communicating with one another over the new secondary wireless channel.

In embodiments, the transceiver mode switching can be asynchronous. For example, the transceiver switching into the passive mode can switch modes after the transceiver switching into the active. The mode switches can be separated by a predetermined time interval, during which the transceiver of the new secondary wireless channel instructs nodes associated with data concentrator 100 to communicate over the new primary wireless channel. During the predetermined time interval the transceiver can also monitor the new secondary wireless channel for nodes attempting to communicate with data concentrator 100, and upon recognizing such nodes, instruct such wireless nodes to communicate over the new primary wireless channel. Thereafter the transceiver can switch into the passive mode, and receive data communication over the new secondary wireless channel to compare utilization with that of the new primary wireless channel.

Figure 4:
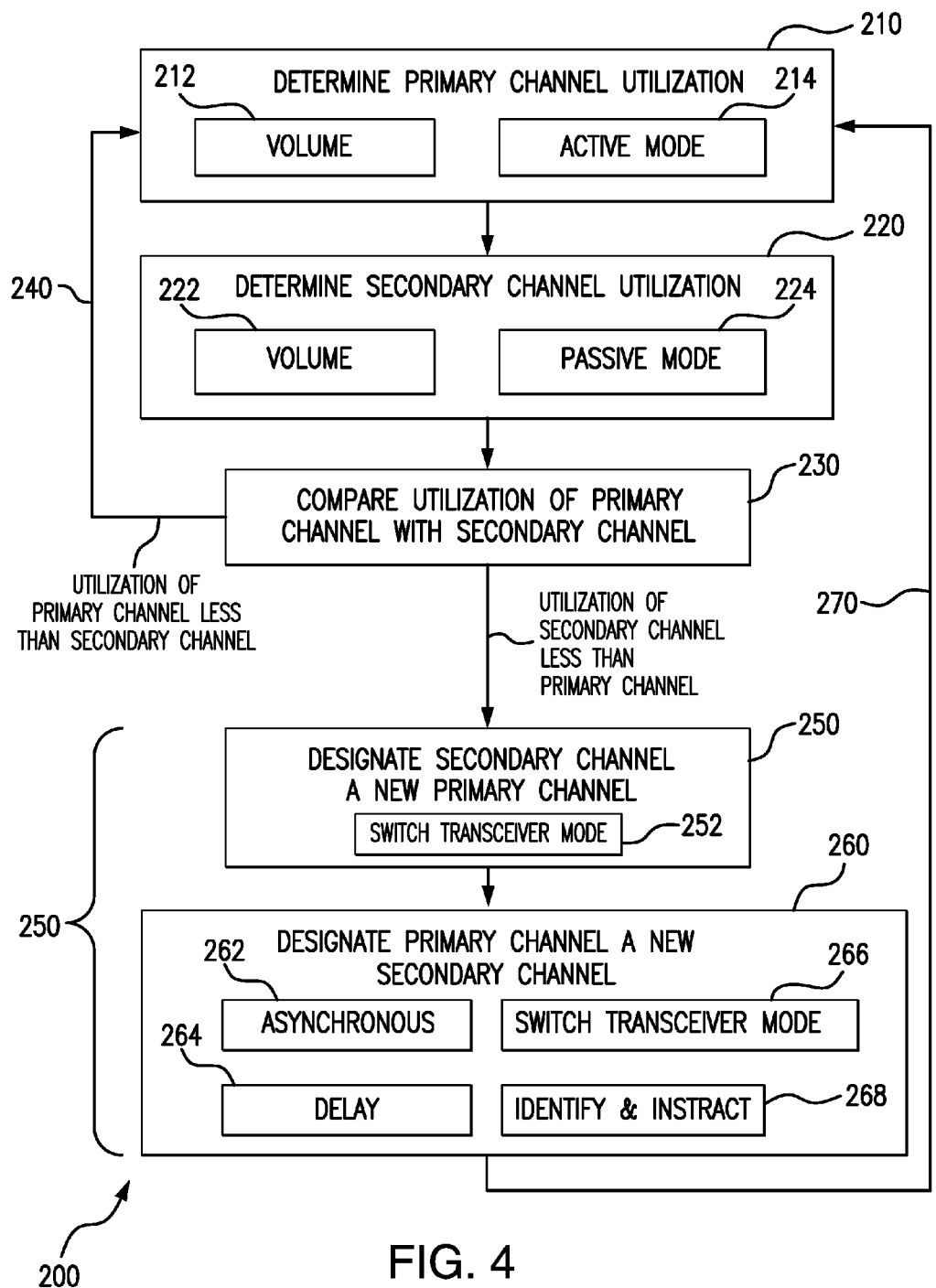
FIG. 4 is a schematic view of a channel management method.

Referring to FIG. 4, a channel management method 200 is shown for a wireless data communication network, e.g., network 10 (shown in FIG. 1). Method 200 includes determining utilization of a primary wireless channel, e.g., primary wireless channel A (shown in FIG. 2), as shown with box 210. This can include determining a volume of data communication over the primary wireless channel using a first transceiver of a data concentrator, e.g., first transceiver 104 (shown in FIG. 1) of data concentrator 100 (shown in FIG. 1), as shown with box 212. It can also be done using the transceiver while operating in an active mode, as shown with box 214.

Method 200 also includes determining utilization of one or more secondary wireless channels, e.g., secondary wireless channel B (shown in FIG. 2), as shown with box 220. Utilization of the primary wireless channel is compared with utilization of the secondary wireless channel, as shown with box 230. This can include determining a volume of data communication over the secondary wireless channel using a second transceiver, e.g., second transceiver 106 (shown in FIG. 1) of the data concentrator, as shown with box 222. It can also be done using the transceiver while operating in a passive mode, as shown with box 224.

If utilization of the primary wireless channel is lower than utilization of the secondary wireless channel then channel designations remain unchanged, and utilization monitoring of the primary wireless channel and secondary wireless channels continues iteratively, as shown with arrow 240. If utilization of a secondary wireless channel among the one or more secondary wireless channels is lower than utilization of the primary wireless channel, wireless data communication between the data concentrator and the wireless node is routed from the primary wireless channel to the secondary wireless channel, as shown with bracket 250. This can be done iteratively, as indicated with arrow 270.

Routing data communication from the primary channel to the secondary wireless channel can include designating the secondary wireless channel a new primary wireless channel, as shown with box 250. Designating the secondary wireless channel as the new primary wireless channel can include switching a transceiver previously receiving data communication over the secondary wireless channel in the passive mode into the active mode, wherein the same transceiver that previously received data communication over the secondary wireless channel begins transmitting and receiving data communication over the new primary wireless channel, as shown with box 252.

Routing data communication from the primary channel to the secondary wireless channel can include designating the primary wireless channel a new secondary wireless channel, as shown with box 260. Designating the primary wireless channel as the new secondary wireless channel can include switching a transceiver previously transmitting and receiving data communication over the primary wireless channel in the active mode into the passive mode, wherein the same transceiver that previously transmitted and received data communication over the primary wireless channel ceases transmitting and only receives data communication over the new secondary wireless channel, as shown with box 266. This can be done asynchronously, as shown with box 262. It can also be done with a time delay, as shown with box 264. It is also contemplated that designating the primary wireless channel a new secondary wireless channel can include identifying wireless nodes associated with the remote data concentrator and instructing them to communicate with the data concentrator over the new primary wireless channel, as shown with box 268.

Wireless devices such as remote data concentrators must sometime operate in adverse radio frequency environments. The radio frequency environment can be dynamic, potentially causing wireless communication to degrade over one wireless channel and/or improve over another wireless channel over time. To ensure robust wireless communication over the network, the systems and methods described herein assess the radio frequency environment and shift wireless communication from one wireless channel to another wireless channel responsive to changes in the radio frequency environment that render one wireless channel better able to support data communication than another wireless channel. In embodiments described herein, this is accomplished by including first and second transceivers in a remote data concentrator. The first transceiver provides connectivity for immediate communication needs, sustaining wireless data communication between the remote data concentrator and wireless nodes communicating through the remote data concentrator. The second transceiver provides repair and recovery functionality, and in certain embodiments, is used to search and identify relatively underutilized wireless channels. It is contemplated that the second transceiver can also manage switching wireless nodes to the underutilized wireless channel, such as by monitoring the prior primary wireless channel for remote nodes after the prior wireless channel has been designated a new secondary wireless channel, and directing such nodes as identified to being communicating with the data concentrator using the secondary wireless channel designated as the new primary wireless channel.

The methods and systems of the present disclosure, as described above and shown in the drawings, provide for remote data concentrators with superior properties including improved wireless channel management. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A channel management method, comprising:
   determining utilization of a primary wireless channel;
   determining utilization of a secondary wireless channel;
   comparing utilization of the primary wireless channel with utilization of the secondary wireless channel;
   designating the primary wireless channel a new secondary wireless channel;
   designating the secondary wireless channel a new primary wireless channel; and routing wireless data communication between a remote data concentrator and a wireless node from the primary wireless channel to the secondary wireless channel if the utilization of the secondary wireless channel is lower than the utilization of the primary wireless channel,
   wherein designating the secondary wireless channel a new primary wireless channel includes switching a transceiver monitoring the secondary wireless channel into an active mode, wherein the transceiver transmits and receives data communication over the new primary wireless channel.

2. The method as recited in claim 1, wherein determining utilization of the primary wireless channel comprises determining a volume of data communication over the primary wireless channel using a transceiver transmitting and receiving over the primary wireless channel.

3. The method as recited in claim 1, wherein determining utilization of the secondary wireless channel comprises determining a volume of data communication over the secondary wireless channel using a transceiver receiving only over the secondary wireless channel.

4. A channel management method, comprising:
   determining utilization of a primary wireless channel;
   determining utilization of a secondary wireless channel;
   comparing utilization of the primary wireless channel with utilization of the secondary wireless channel;
   designating the primary wireless channel a new secondary wireless channel;
   designating the secondary wireless channel a new primary wireless channel; and routing wireless data communication between a remote data concentrator and a wireless node from the primary wireless channel to the secondary wireless channel if the utilization of the secondary wireless channel is lower than the utilization of the primary wireless channel,
   wherein designating the primary wireless channel a new secondary wireless channel includes switching a transceiver transmitting and receiving data communication over the primary wireless channel into a passive mode, wherein the transceiver receives data communication over the new secondary wireless channel only.

5. The method as recited in claim 4, wherein determining utilization of the primary wireless channel comprises determining a volume of data communication over the primary wireless channel using a transceiver transmitting and receiving over the primary wireless channel.

6. The method as recited in claim 4, wherein determining utilization of the secondary wireless channel comprises determining a volume of data communication over the secondary wireless channel using a transceiver receiving only over the secondary wireless channel.

7. A channel management method, comprising:
   determining utilization of a primary wireless channel;
   determining utilization of a secondary wireless channel;
   comparing utilization of the primary wireless channel with utilization of the secondary wireless channel;
   designating the primary wireless channel a new secondary wireless channel;
   designating the secondary wireless channel a new primary wireless channel; and routing wireless data communication between a remote data concentrator and a wireless node from the primary wireless channel to the secondary wireless channel if the utilization of the secondary wireless channel is lower than the utilization of the primary wireless channel,
   wherein designating the secondary wireless channel a new primary wireless channel is done asynchronously with designating the primary wireless channel a new secondary wireless channel.

8. The method as recited in claim 7, wherein determining utilization of the primary wireless channel comprises determining a volume of data communication over the primary wireless channel using a transceiver transmitting and receiving over the primary wireless channel.

9. The method as recited in claim 7, wherein determining utilization of the secondary wireless channel comprises determining a volume of data communication over the secondary wireless channel using a transceiver receiving only over the secondary wireless channel.

10. A channel management method, comprising:
    determining utilization of a primary wireless channel;
    determining utilization of a secondary wireless channel;
    comparing utilization of the primary wireless channel with utilization of the secondary wireless channel;
    designating the primary wireless channel a new secondary wireless channel;
    designating the secondary wireless channel a new primary wireless channel; and routing wireless data communication between a remote data concentrator and a wireless node from the primary wireless channel to the secondary wireless channel if the utilization of the secondary wireless channel is lower than the utilization of the primary wireless channel, wherein designating the primary wireless channel a new secondary wireless channel occurs after a predetermined time interval tolls following designating the secondary wireless channel a new primary wireless channel.

11. The method as recited in claim 10, wherein determining utilization of the primary wireless channel comprises determining a volume of data communication over the primary wireless channel using a transceiver transmitting and receiving over the primary wireless channel.

12. The method as recited in claim 10, wherein determining utilization of the secondary wireless channel comprises determining a volume of data communication over the secondary wireless channel using a transceiver receiving only over the secondary wireless channel.

13. A channel management method, comprising:
determining utilization of a primary wireless channel;
determining utilization of a secondary wireless channel;
comparing utilization of the primary wireless channel with utilization of the secondary wireless channel;
designating the primary wireless channel a new secondary wireless channel;
routing wireless data communication between a remote data concentrator and a wireless node from the primary wireless channel to the secondary wireless channel if the utilization of the secondary wireless channel is lower than the utilization of the primary wireless channel;
monitoring the secondary wireless channel for wireless nodes attempting to communicate with the data concentrator for a predetermined time interval; and
directing wireless nodes to a new primary wireless channel during time interval.

14. The method as recited in claim 13, wherein determining utilization of the primary wireless channel comprises determining a volume of data communication over the primary wireless channel using a transceiver transmitting and receiving over the primary wireless channel.

15. The method as recited in claim 13, wherein determining utilization of the secondary wireless channel comprises determining a volume of data communication over the secondary wireless channel using a transceiver receiving only over the secondary wireless channel.

16. A data concentrator for a wireless network, comprising:
a first transceiver;
a second transceiver configured for operation independent of the first transceiver; and
a control module operatively connected to the first transceiver and the second transceiver, wherein the control module is responsive to machine readable instructions to:
determine utilization of a primary wireless channel;
determine utilization of a secondary wireless channel;
compare utilization of the primary wireless channel with utilization of the secondary wireless channel;
designate the secondary wireless channel a new primary wireless channel;
switch the second transceiver from a passive mode to an active mode, wherein the second transceiver transmits and receives data communication over the new primary wireless channel; and
route wireless data communication between a data concentrator and a remote node from the primary wireless channel using the first transceiver to the secondary wireless channel using the second transceiver if the utilization of the secondary wireless channel is lower than the utilization of the primary wireless channel.

17. The data concentrator as recited in claim 16, wherein the first transceiver is identical to the second transceiver.

18. The data concentrator as recited in claim 16, wherein the data concentrator is a remote data concentrator for an aircraft wireless data network.

19. A data concentrator for a wireless network, comprising:
a first transceiver;
a second transceiver configured for operation independent of the first transceiver; and
a control module operatively connected to the first transceiver and the second transceiver, wherein the control module is responsive to machine readable instructions to:
determine utilization of a primary wireless channel;
determine utilization of a secondary wireless channel;
compare utilization of the primary wireless channel with utilization of the secondary wireless channel;
designate the primary wireless channel a new secondary wireless channel;
switch the first transceiver from an active mode to a passive mode, wherein the first transceiver receives data communication over the new secondary wireless channel subsequent to switching into the passive mode; and
route wireless data communication between a data concentrator and a remote node from the primary wireless channel using the first transceiver to the secondary wireless channel using the second transceiver if the utilization of the secondary wireless channel is lower than the utilization of the primary wireless channel.

20. The data concentrator as recited in claim 19, wherein the machine readable instructions cause the control module to switch the first transceiver from an active mode to a passive asynchronously with the control module switching the second transceiver from the passive mode to the active mode.

21. The data concentrator as recited in claim 19, wherein the first transceiver is identical to the second transceiver.

22. The data concentrator as recited in claim 19, wherein the data concentrator is a remote data concentrator for an aircraft wireless data network.

* * * * *